United States Patent
Kesavan et al.

(10) Patent No.: US 9,442,971 B2
(45) Date of Patent: Sep. 13, 2016

(54) WEIGHTED TRANSACTION PRIORITY BASED DYNAMICALLY UPON PHASE OF TRANSACTION COMPLETION

(71) Applicant: International Business Machines Corporation, Armonk, NY (US)

(72) Inventors: Sanjay M. Kesavan, Bangalore (IN); Rajesh C. Lalgowdar, Bangalore (IN); Ian Robinson, Southampton (GB); Lohitashwa Thyagaraj, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 415 days.

(21) Appl. No.: 13/864,839

(22) Filed: Apr. 17, 2013

(65) Prior Publication Data
US 2014/0317070 A1    Oct. 23, 2014

(51) Int. Cl.
*G06F 17/30* (2006.01)

(52) U.S. Cl.
CPC ............... *G06F 17/30371* (2013.01)

(58) Field of Classification Search
CPC ............ G06F 17/30371; G06F 9/466; G06F 2221/0795; G06Q 10/025
USPC ......................................................... 707/607
See application file for complete search history.

(56) References Cited

U.S. PATENT DOCUMENTS

| | | | |
|---|---|---|---|
| 5,504,899 A | 4/1996 | Raz | |
| 6,823,355 B1* | 11/2004 | Novaes et al. | 709/201 |
| 7,353,495 B2 | 4/2008 | Somogyi | |
| 7,490,327 B1 | 2/2009 | Branda et al. | |
| 8,073,962 B2 | 12/2011 | Parkinson et al. | |
| 8,166,484 B2* | 4/2012 | Kawato | 718/104 |
| 8,185,422 B2* | 5/2012 | Yurekli et al. | 705/7.11 |
| 8,479,204 B1* | 7/2013 | Labonte | G06F 11/3419 718/100 |
| 2002/0087366 A1* | 7/2002 | Collier | G06F 9/466 705/5 |
| 2003/0167329 A1* | 9/2003 | Kurakake | G06F 9/5044 709/226 |
| 2003/0216951 A1* | 11/2003 | Ginis | G06Q 10/06 705/7.26 |
| 2009/0222823 A1 | 9/2009 | Parkinson et al. | |
| 2010/0017642 A1 | 1/2010 | Myers | |
| 2010/0023949 A1* | 1/2010 | Jackson | G06F 9/5027 718/104 |
| 2010/0146509 A1 | 6/2010 | Kaczynski et al. | |

(Continued)

OTHER PUBLICATIONS

Author Unknown, CICS Transaction Server v3.1: Prioritizing Tasks, Webpage/site, Printed from website on Apr. 5, 2013, pp. 1-3, International Business Machines Corporation, Published online at: http://publib.boulder.ibm.com/infocenter/cicsts/v3r1/topic/com.ibm.cics.ts31.doc/dfht3/dfht34w.htm?path=8_4_12_5_9_5#DFHT34W.

(Continued)

*Primary Examiner* — Alicia Willoughby
(74) *Attorney, Agent, or Firm* — Lee Law, PLLC; Christopher B. Lee

(57) ABSTRACT

Resource reservation request information originated by a client application during a first phase of a distributed multi-phase transaction is received at a processor. The resource reservation request information specifies a first resource the client application intends to access during a first subsequent phase of the distributed multi-phase transaction after the first phase of the distributed multi-phase transaction is completed. The requested first resource is reserved on behalf of the client application. A transaction weighted priority is assigned to the distributed multi-phase transaction of the client application based upon a stage of completion of the distributed multi-phase transaction.

20 Claims, 8 Drawing Sheets

(56) References Cited

U.S. PATENT DOCUMENTS

| | | | |
|---|---|---|---|
| 2011/0035253 A1* | 2/2011 | Mason et al. ................ | 705/9 |
| 2011/0078516 A1 | 3/2011 | El-Kersh et al. | |
| 2011/0078687 A1 | 3/2011 | Somogyi | |
| 2011/0153797 A1* | 6/2011 | Danilov ................ | G06F 9/466 709/223 |
| 2012/0089789 A1* | 4/2012 | Shirlen ............... | G06F 12/0215 711/154 |
| 2013/0227127 A1* | 8/2013 | Takano ................ | G06F 9/5044 709/224 |
| 2014/0036929 A1* | 2/2014 | Lih ........................ | H04L 49/90 370/412 |

OTHER PUBLICATIONS

Tony Flint, XA and Oracle controlled Distributed Transactions, White Paper, Jun. 2010, pp. 1-28, Oracle Corporation, Published online at: http://www.oracle.com/technetwork/products/clustering/overview/distributed-transactions-and-xa-163941.pdf.

Annie Liu, Implementing Distributed Transactions, Slide Presentation/Course Handout, 2006, pp. 1-12 (plus 5 citation pages added), Stony Brook University, Published online at: http://www.cs.sunysb.edu/~liu/cse315/24.pdf.

James McGovern, et al., Chapter 14: Transaction Management, Book: Java Web Services Architecture, May 2003, pp. 583-619 (plus 2 citation pages added), Morgan Kaufmann, San Francisco, CA, USA.

David T. McWherter, et al., Priority Mechanisms for OLTP and Transactional Web Applications, Proceedings of the 20th International Conference on Data Engineering (ICDE), 2004, pp. 1-12, IEEE Computer Society, Washington, DC, USA.

Author Unknown, Establishing a Priority-based Connection, Webpage/site, Printed from website on Apr. 5, 2013, pp. 1-2, Microsoft Corporation, Published online at: http://msdn.microsoft.com/en-us/library/bb416321.aspx.

Usman Shaheen, Automatically Saving Web Form Data, Webpage/site, Sep. 24, 2006, pp. 1-4, Code Project, Published online at: http://www.codeproject.com/KB/aspnet/AutoSaveFormData.aspx.

Raphael Caixeta, 10 Tips for Optimizing Web From Submission Usability, Webpage/site, Printed from website on Apr. 5, 2013, pp. 1-26, Six Revisions, Published online at: http://sixrevisions.com/user-interface/10-tips-for-optimizing-web-form-submission-usability/.

* cited by examiner

| XID | RRID | TRANSACTION WEIGHT | RESOURCE REFERENCE | RESERVED RESOURCE WAIT PERIOD |
|---|---|---|---|---|
| (1) 1234 | 1111 | 0 | DATABASE_1 112 | [[10 SECONDS]] 500 MS |
| (2) 1234 | 2222 | 10 | DATABASE_N 114 | [[10 SECONDS]] 750 MS |
| (3) 1234 | 3333 | 20 | MESSAGING SERVICE RESOURCE PROVIDER_2 236 | 10 SECONDS |

FIG. 5

WEIGHTED TRANSACTION PRIORITY BASED DYNAMICALLY UPON PHASE OF TRANSACTION COMPLETION

BACKGROUND

The present invention relates to transaction processing. More particularly, the present invention relates to weighted transaction priority based dynamically upon phase of transaction completion.

Distributed transactions, as with other forms of transactions, are designated to operate under four properties called atomicity, consistency, isolation, and durability (known as the "ACID" properties of transactions). Atomicity dictates that an all-or-nothing outcome for a unit of work is to be maintained such that the entire transaction either completes or is rolled back. Consistency is intended to ensure that only valid states for stored data result from transactional processing. Isolation ensures that independent transactions do not interfere with one another. Durability refers to the stability of storage of data committed using a transactional approach.

BRIEF SUMMARY

A method includes receiving, at a processor, resource reservation request information originated by a client application during a first phase of a distributed multi-phase transaction, where the resource reservation request information specifies a first resource the client application intends to access during a first subsequent phase of the distributed multi-phase transaction after the first phase of the distributed multi-phase transaction is completed; reserving the requested first resource on behalf of the client application; and assigning a transaction weighted priority to the distributed multi-phase transaction of the client application based upon a stage of completion of the distributed multi-phase transaction.

A system includes a memory and a processor programmed to: receive resource reservation request information originated by a client application during a first phase of a distributed multi-phase transaction, where the resource reservation request information specifies a first resource the client application intends to access during a first subsequent phase of the distributed multi-phase transaction after the first phase of the distributed multi-phase transaction is completed; reserve the requested first resource on behalf of the client application; and assign within the memory a transaction weighted priority to the distributed multi-phase transaction of the client application based upon a stage of completion of the distributed multi-phase transaction.

A computer program product includes a computer readable storage medium having computer readable program code embodied therewith, where the computer readable program code when executed on a computer causes the computer to: receive resource reservation request information originated by a client application during a first phase of a distributed multi-phase transaction, where the resource reservation request information specifies a first resource the client application intends to access during a first subsequent phase of the distributed multi-phase transaction after the first phase of the distributed multi-phase transaction is completed; reserve the requested first resource on behalf of the client application; and assign a transaction weighted priority to the distributed multi-phase transaction of the client application based upon a stage of completion of the distributed multi-phase transaction.

BRIEF DESCRIPTION OF THE SEVERAL VIEWS OF THE DRAWINGS

FIG. 5 is a memory diagram of an example of an implementation of a transaction log that includes connection request information created by a multi-phase transaction manager according to an embodiment of the present subject matter;

DETAILED DESCRIPTION

Figure 1:
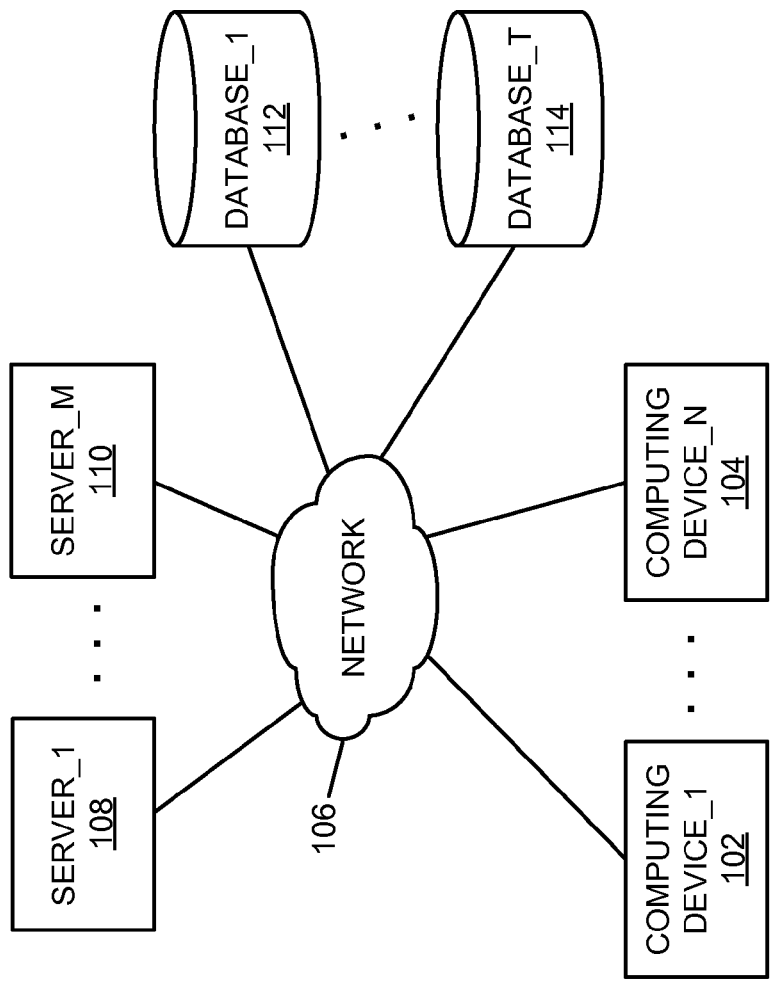
FIG. 1 is a block diagram of an example of an implementation of a system for weighted transaction priority based dynamically upon phase of transaction completion according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides weighted transaction priority based dynamically upon phase of transaction completion. The present technology address problems, such as resource limitations and resource contention, within distributed multi-phase transactional systems, by intelligently managing the relative priority of transactions based on a state of the transactions within a distributed transaction flow involving multiple resource managers. The present technology identifies the respective phase of processing in which a particular distributed multi-phase transaction is executing, and assigns a weighting for that transaction. The weighting assigned to the transactions progressively increases in priority as the distributed multi-phase transactions progress toward completion through the respective phases of the distributed transaction. As such, distributed transactions that are closer to completion have priority over newer transactions. The present technology operates by reserving resources intended to be used by transactions in a next/subsequent phase of a distributed transaction. As such, as transactions progress, resource availability may be efficiently provided to subsequent phases of transactional processing. Accordingly, resource demand and resource contention may be reduced within multi-phase distributed transactional systems by allowing higher-priority/later-phase transactions to complete more efficiently.

As such, the present technology may alleviate network and transactional server congestion and decrease bandwidth consumption by completing transactions that are closer to completion ahead of newer transactions. The increasing priority of later-phase transactions is utilized to give more resource priority for those later-phase transactions based on the phase in which they are currently executing when the resource for the next transactional phase is reserved. A mechanism is also provided to notify a resource manager (e.g., a connection manager, database manager, etc.) to allocate/reserve a resource (e.g., a connection) in advance with an indication of a particular application that is participating in a distributed transaction that is intending to access a particular resource during the subsequent phase of the respective distributed transaction. When the application is ready to utilize a particular resource, the reserved resource is available for use, and the transaction may complete more efficiently than in conventional contention-based systems.

For purposes of the examples described herein, transactional hosts/servers provide transactional resources referred to as resource managers, while a transaction manager is responsible for creating and managing a global transaction that encompasses all operations against the transactional resources. Further, to achieve distributed transactional integrity, an extended architecture (XA) model is utilized to achieve cumulative transactional integrity, while other transactional models may be utilized to implement the present technology. The algorithm followed within the examples described herein to achieve the completion of the transaction integrity across multiple resources is referred to as a two-phase commit (e.g., 2PC), though other algorithms are possible and all such algorithms are considered to be within the scope of the subject matter described herein.

It should be noted that conception of the present subject matter resulted from recognition of certain limitations associated with distributed transaction processing. For example, it was observed that distributed transactions are cumulative in operational scope, in that two or more network hosts are involved to perform the requested transactions and these hosts are involved in different sequential "phases" of the transaction. It was additionally observed that the transactional atomicity, consistency, isolation, and durability (ACID) transaction properties are also cumulative in operational scope, such that additional resources are utilized as distributed transactions progress. In this context, it was observed that multi-phase distributed transactions may utilize multiple servers/interface technologies and/or databases and different technologies (e.g., log-in and server authentication, information entry and server validation, and presentation and acceptance of terms and conditions) during the progression of a distributed transaction. It was additionally observed that complex on-line transaction processing (OLTP) systems are subject to varying loads depending on the usage scenarios and, as such, performance of these systems may be affected. These systems in general include on-line multi-user systems with main entry points for an organization's main business. Systems, such as on-line travel reservation systems, government utility systems, on-line sales sites, and others are subjected to load variations. In all of these systems, users are required to spend a lot of time entering data and/or choosing options for achieving the desired transactions. The data entered is then submitted to a back-end system for processing. While there may be numerous reasons for failures and delays to occur in any phase, it was observed within this context that a contributor to transaction failure or delay of the entire multi-phase distributed transaction processing is obtaining a connection to the back-end system (e.g., either a database or messaging engine) due to a large number of transactions happening at the same time. It was observed that under a heavy load, there may be contention between several applications trying to get a connection from a given connection pool (e.g., a J2C connection pool) to the back-end system(s). It was determined that if an application is unable to obtain a connection quickly, the entire transaction may be blocked, all of the resources involved in the previous phases of processing the transaction will be held/blocked, and the transaction may get timed out. It was determined that if a problem occurs in any one of the phases of a multi-phase transaction and the transaction times out, the user must re-access the distributed transaction system and re-start a session to attempt to complete the transaction, which results in more connection attempts to the back-end resources. As a result, it was determined that other distributed transactions will have to wait for each resource to get their respective work completed while other transactions are timed out, and that transactions that were almost completed (and that timed out) will have to compete again for with more applications to try to obtain resources that were previously requested. It was further determined that because conventional connection managers are unable to predict which resource requests to give priority to for completion based upon its transactional activity, there is no conventional mechanism by which to resolve contention for limited resources, and as a result, there is no conventional mechanism by which to solve the problem of completing later-stage transactions with priority over newer transactions. In view of these observations and determinations, it was further determined that the present technology to prioritize transactions that are in later phases relative to transactions that are in earlier phases may improve transaction completion efficiency for users and alleviate resource demand, both of which may reduce real-time competition for resources by reducing repeated attempts to re-start transactions to access resources that have been allowed to complete by prioritizing them ahead of earlier-phase transactions. The present subject matter improves distributed multi-phase transactional processing by providing for weighted transaction priority based dynamically upon phase of transaction completion, as described above and in more detail below. Accordingly, improved transactional processing and resource utilization may be obtained through use of the present technology.

The following example details one possible scenario of a distributed multi-phase transaction that was recognized as one of many scenarios that may be improved by use of the present technology. It is understood that many other example scenarios are possible in association with distributed multi-phase transaction processing that may be improved using the present technology, and that the present subject matter applies to any such scenario. It is assumed, for purposes of the present example, that a transaction manager manages the distributed multi-phase transaction as a global transaction.

Within a first phase (Phase1) of an example distributed multi-phase transaction, a management database (MDB) may be configured to receive a message from a queue on a first messaging engine (ME1). As part of the same transaction, the following actions may be configured to occur in association with the MDB. Within a second phase (Phase2) of the example distributed multi-phase transaction, a first Enterprise JavaBean® (EJB1) program may be invoked from within the MDB to insert a row in a database (DB1). Within a third phase (Phase3) of the example distributed multi-phase transaction, a second Enterprise JavaBean® (EJB2) program may be invoked from within the same MDB to update another row in a different database (DB2). Within a fourth phase (Phase4) of the example distributed multi-phase transaction, an event may be generated by an application that is sent to an event queue in a second messaging engine (ME2). Within a fifth phase (Phase5) of the example distributed multi-phase transaction, a response to the request may be sent to another queue in a third messaging engine (ME3).

In the above example scenario of a distributed multi-phase transaction, five (5) different resources participate in a single XA transaction. If a failure is encountered in any of the phases, then the entire transaction must be rolled back to comply with the ACID transaction properties. It was further determined that the cost of rolling back the transaction increases depending on the phase in which the failure is encountered.

For example, if a failure is encountered at Phase2, the transaction manager has to rollback only those activities that were completed in Phase1. On the other hand, if the failure occurs at Phase5, then all the transactions that were performed in the previous four (4) phases must be rolled back. This will create a significant impact on the overall resource utilization. The present technology may be utilized to weight (e.g., a weighted average) transactions in later stages so that later-stage transactions may complete more efficiently and reduce costs of transactional processing.

To further the present example, after the user enters the data and submits the page for processing, the completeness of the transaction depends on the performance of back-end middle-ware systems. In the above scenario, the message put to the queue for the MDB to process may be considered as a request and the online user will wait for a response until Phase5 processing occurs, where the MDB sends the response.

As described above, a contributor to transaction failure or delay of the entire transaction processing is obtaining a connection to the back-end system (e.g., either a database or messaging engine). Under a heavy load, there may be a contention between several applications trying to get a connection from a given connection pool (e.g., a J2C connection pool). In the above scenario, if an application is unable to get a connection quickly in Phase4 or Phase5, this will block the entire transaction and hold all the resources involved in the previous Phase3 or Phase4, and the transaction may get timed out and thus cause a rollback of that and other transactions. The present subject matter addresses such scenarios and may improve multi-phase distributed transactional processing using the technology described in more detail below.

As introduced above, the present technology operates to resolve resource limitation and contention problems by intelligently handling the priority of transactions based on the state of the transaction within a distributed transaction flow involving multiple resource managers. The present examples utilize "connections" as the example "resource," and "connection managers" and the example "resource managers," though it is understood that any resources utilized within a distributed transactional system may be processed as described below to implement the present technology.

To derive the assigned priority for a transaction, there are few activities involved. First, an application that is using distributed resources sends a resource reservation request for reservation of the respective resources to the appropriate connection manager. The resource reservation request includes a start time of the transaction, one or more unique tokens (e.g., a transaction identifier (XID) and a resource reference identifier (RRID)) usable to identify the transaction and resource to be reserved, and a maximum reservation time/duration for the reservation of the requested resources. The connection manager establishes/configures a resource (e.g., connection) reservation with the specified maximum reservation time/duration correlated with the specified start time of the transaction, and associates the reservation with the specified unique tokens.

Second, the connection manager reserves a connection for the requesting application in advance from a connection pool. The reservation indicates that a transaction has just started and the connection to that particular resource will be required within a short time. If the request for the connection is not received by the connection manager within the requested maximum reservation time/duration from the configured transaction start time, the resource reservation may be cancelled.

Third, when the resource's connection/resource manager receives the request for the reservation of a connection, the connection pool checks the age of the transaction that requested the resource and the requesting application identifier (ID), and then gives priority to the oldest transaction that is requesting reservation of the connection/resource. As such, the oldest requesting transaction may be identified and assigned a higher priority for resource reference and acquisition.

Fourth, the application sends the request for the reserved connection to the pool along with the unique tokens (e.g., again the XID and RRID for example). The connection pool returns the reserved connection from the pool.

The weighted transaction priority based dynamically upon phase of transaction completion described herein may be performed in real time to allow prompt priority adjustment of transactions as transaction progress. For purposes of the present description, real time shall include any time frame of sufficiently short duration as to provide reasonable response time for information processing acceptable to a user of the subject matter described. Additionally, the term "real time" shall include what is commonly termed "near real time"-generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for weighted transaction priority based dynamically upon phase of transaction completion. A computing device_1 102 through a computing device_N 104 communicate via a network 106 with a server_1 108 through a server_M 110. The server_1 108 through the server_M 110 provide transactional and other processing services for applications executed by the computing device_1 102 through the computing device_N 104. The server_1 108 through the server_M 110 utilize a database_1 112 through a database_T 114 for database storage and services to support the transactional and other processing services for the applications executed by the computing device_1 102 through the computing device_N 104.

As will be described in more detail below in association with FIG. 2 through FIG. 7B, the devices within the system 100 inter-operate to provide automated weighted transaction priority based dynamically upon phase of transaction completion. The automated weighted transaction priority based dynamically upon phase of transaction completion is based upon progressive reprioritization of transactions as the transactions progress to allow later-stage transactions to have priority over resource utilization through reservation of resources within current transactional phases that are to be used in later transactional phases. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a web server, application server, or other data server device. The server_1 108 through the server_M 110 may each provide transaction management and resource management services. The database_1 112 through the database_T 114 may also provide transactional services, such as resource management services, as appropriate for a given implementation.

Figure 2:
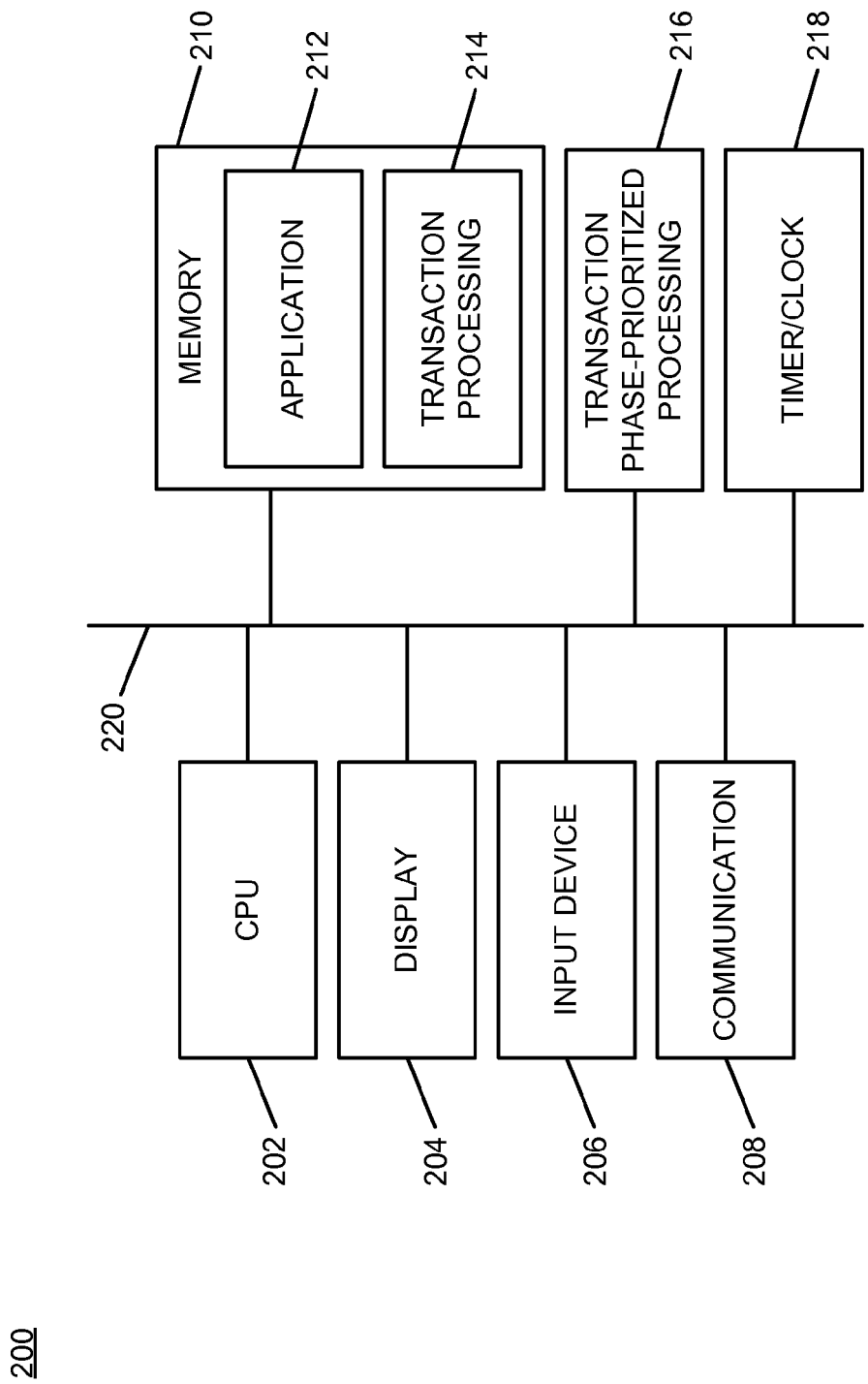
FIG. 2 is a block diagram of an example of an implementation of a core processing module capable of performing weighted transaction priority based dynamically upon phase of transaction completion according to an embodiment of the present subject matter.

FIG. 2 is a block diagram of an example of an implementation of a core processing module 200 capable of performing weighted transaction priority based dynamically upon phase of transaction completion. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of the weighted transaction priority based dynamically upon phase of transaction completion described herein in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices, such as for example the server_1 108 through the server_M 110. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes an application area 212 that provides storage and execution memory space for one or more applications executed by the CPU 202 in association with the core processing module 200. The memory 210 also includes a transaction processing storage area 214. Where the core processing module 200 is implemented in association with the computing device_1 102 through the computing device_N 104, the transaction processing storage area 214 may provide storage for transactional processing information, such as outstanding transactional-related requests (e.g., transaction, resource reservation, and other requests) sent to a server from a computing device and related transactional processing data/information. Where the core processing module 200 is implemented in association with the server_1 108 through the server_M 110, the transaction processing storage area 214 may provide storage for transactional processing information, such transactional-related requests (e.g., transaction, resource reservation, and other requests) received from a computing device, and transactional processing data and information associated with determination and processing of transaction priorities as described above and in more detail below.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A transaction phase-prioritized processing module 216 is also illustrated. The transaction phase-prioritized processing module 216 provides transaction prioritization and transaction management for the core processing module 200, as described above and in more detail below. The transaction phase-prioritized processing module 216 implements the automated weighted transaction priority based dynamically upon phase of transaction completion of the core processing module 200. As described above, the transaction phase-prioritized processing module 216 may have different and complementary processing related to prioritized transactions based upon whether the core processing module 200 is implemented within the computing device_1 102 through the computing device_N 104 or the server_1 108 through the server_M 110. Further, as described in more detail below, where implemented in association with the server_1 108 through the server_M 110, the transaction phase-prioritized processing module 216 may include a transaction manager component, a multi-phase global resource coordinator component that manages phase-progressive priority for multi-phase transactions and resource reservations requests, and one or more connection manager components that provide connectivity to back-end systems, such as the database_1 112 through the database_T 114.

It should also be noted that the transaction phase-prioritized processing module 216 may form a portion of other circuitry described without departure from the scope of the present subject matter. Further, the transaction phase-prioritized processing module 216 may alternatively be implemented as an application stored within the memory 210. In such an implementation, the transaction phase-prioritized processing module 216 may include instructions executed by the CPU 202 for performing the functionality described herein. The CPU 202 may execute these instructions to provide the processing capabilities described above and in more detail below for the core processing module 200. The transaction phase-prioritized processing module 216 may form a portion of an interrupt service routine (ISR), a portion of an operating system, a portion of a browser application, or a portion of a separate application without departure from the scope of the present subject matter.

A timer/clock module 218 is also illustrated and used to determine timing and date information, such as timing information associated with distributed multi-phase transactions as the transactions progress through different phases of processing, as described above and in more detail below. As such, the transaction phase-prioritized processing module 216 may utilize information derived from the timer/clock module 218 for information processing activities, such as the weighted transaction priority based dynamically upon phase of transaction completion described herein.

The CPU 202, the display 204, the input device 206, the communication module 208, the memory 210, the transaction phase-prioritized processing module 216, and the timer/clock module 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the database_1 112 through the database_T 114 are illustrated as separate components for purposes of example within FIG. 1, the information stored within the database_1 112 through the database_T 114 may also/alternatively be stored within the memory 210 without departure from the scope of the present subject matter. Accordingly, the core processing module 200 may take many forms and may be associated with many platforms.

Figure 3:
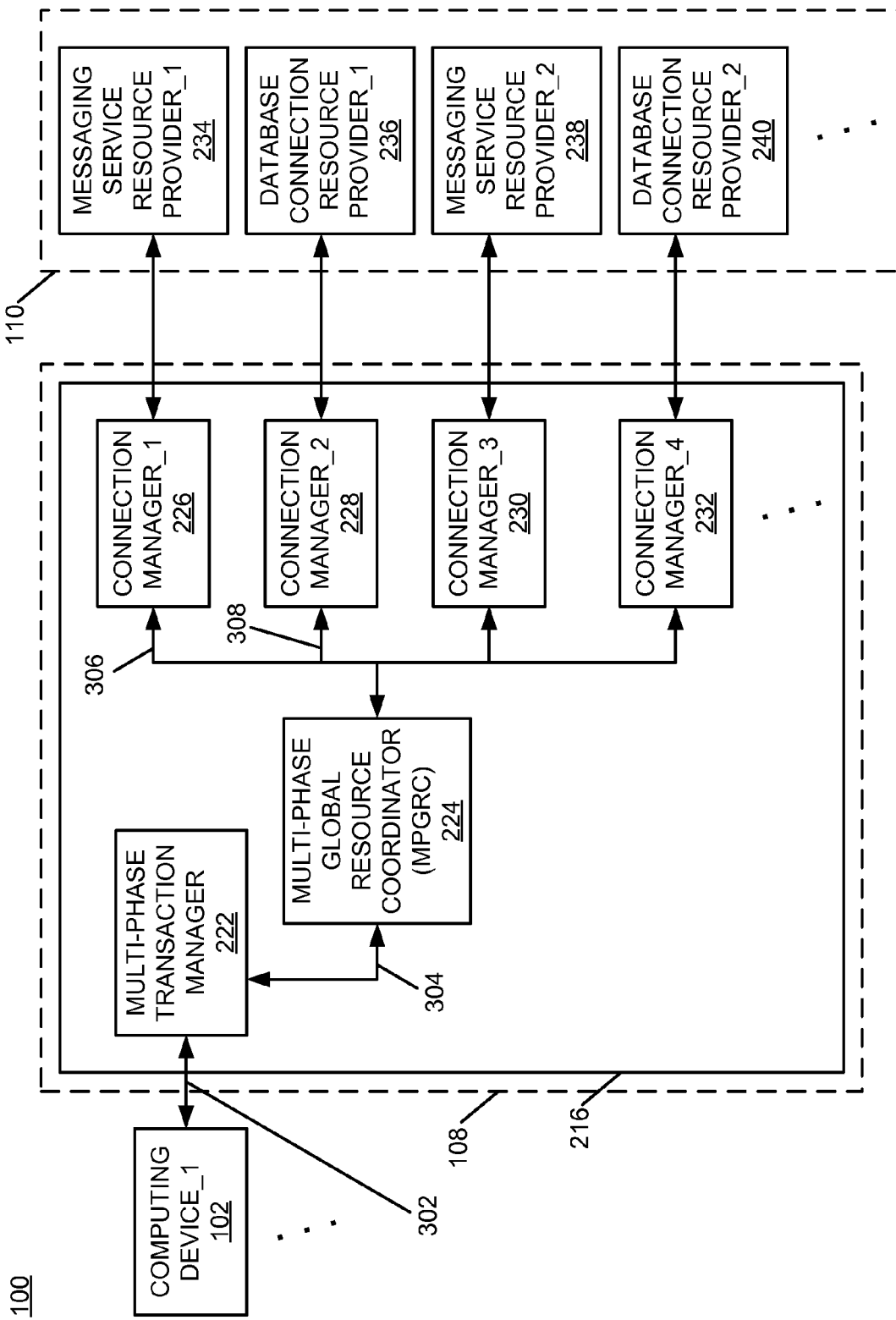
FIG. 3 is a combined block diagram and flow sequence diagram that illustrates more detail of the system of FIG. 1 that provides a foundation for an example of an implementation of a process for weighted transaction priority based dynamically upon phase of transaction completion according to an embodiment of the present subject matter.

FIG. 3 is a combined block diagram and flow sequence diagram that illustrates more detail of the system 100 of FIG. 1 that provides a foundation for an example of an implementation of a process 300 for weighted transaction priority based dynamically upon phase of transaction completion. As can be seen within FIG. 3, the computing device_1 102 is again illustrated. The computing device_1 102 is assumed for purposes of the present example to execute a client application, such as a Java® 2 Platform, Enterprise Edition (J2EE®) client application or other client application as appropriate for a given implementation. The other components within FIG. 3 may include, for example, components such as Java® message service (JMS) components, Java® database connectivity (JDBC®) components, Java 2 Platform, Enterprise Edition (J2EE®) components, and J2EE® connector (J2C) components.

Within FIG. 3, one implementation of the transaction phase-prioritized processing module 216 of the core processing module 200 of FIG. 2 is also illustrated. For purposes of the present description, it is assumed that the transaction phase-prioritized processing module 216 of the core processing module 200 is implemented in association with one of the server_1 108 through the server_M 110. It should be noted that other components, including additional components of the core processing module 200 and external elements such as the network 106, are omitted to prevent crowding within the drawing, though it is understood that these elements form a portion of the present example. The ellipsis dots below the computing device_1 102 represent that other computing devices, and executed client applications, may interact with the server_1 108 concurrently.

The transaction phase-prioritized processing module 216 implements a multi-phase transaction manager 222 and a multi-phase global resource coordinator (MPGRC) 224. As described in more detail below, the multi-phase transaction manager 222 interacts with the client application executed by the computing device_1 102 to initiate transactional services within the system 100 on behalf of the client application executed by the computing device_1 102. The MPGRC 224 operates to provide global transactional management capabilities for multiple client applications executed by the computing device_1 102 through the computing device_N 104. The MPGRC 224 implements the coordination of weighted transaction priority based dynamically upon phase of transaction completion, as described in more detail below. As described in more detail below, the MPGRC 224 represents a new component that is responsible for allocating the weighting for each of multiple transactions as the transactions progress through multiple phases of connection requests and back-end resource accesses. The MPGRC 224 also notifies connection managers to reserve connections for client applications so that connections are available when they are requested by the client applications to improve transaction completion efficiency for all client applications.

Returning to the description of the transaction phase-prioritized processing module 216, the transaction phase-prioritized processing module 216 also implements a connection manager_1 226, a connection manager_2 228, a connection manager_3 230, and a connection manager_4 232. The ellipsis dots below the connection manager_4 232 represent that other connection managers may be implemented, as appropriate for the given implementation.

The server_M 110 is also illustrated as an example back-end platform for purposes of example. The server_M 110 implements several back-end resource providers, including a messaging service resource provider_1 234, a database connection resource provider_1 236, a messaging service resource provider_2 238, and a database connection resource provider_2 240. Again, the ellipsis dots below the database connection resource provider_2 240 represent that other resource managers may be implemented, as appropriate for the given implementation.

Additionally, it should be noted that the present example illustrates all of the messaging service resource provider_1 234, the database connection resource provider_1 236, the messaging service resource provider_2 238, and the database connection resource provider_2 240 implemented by the single server_M 110. However, this example is to prevent crowding with the drawing. As such, it should be noted that the respective resource managers may be implemented by several different components as appropriate for a given implementation. For example, the database connection resource provider_1 236 may be implemented by one of the database_1 112 through the database_T 114, and similar implementations may be designated for other components without departure from the scope of the present subject matter. Further, it should be noted that, for purposes of the present example, the individual connection managers 226 through 232 each point to an individual back-end resource manager 234 through 240, though the present example may be implemented such that one connection manager manages multiple resources without departure from the scope of the present technology.

With the foundation of the present example as described above, the example process 300 for weighted transaction priority based dynamically upon phase of transaction completion will now be described. To implement the weighted transaction priority based dynamically upon phase of transaction completion, a sequence of processing tasks is implemented by the respective components described within FIG. 3.

A high-level overview of the sequence is described in more detail below of a single multi-phase complex transaction (hereinafter alternatively the "transaction") that involves multiple distributed resources. As such, the transaction involves multiple phases of connection requests and resource accesses to complete the single multi-phase complex transaction.

The first phase of the transaction is that the client application executed by the client device_1 102 connects to a first messaging engine to get a message from a first message queue hosted by the first messaging engine, such as a first Java™ messaging service (JMS) queue. The client application then connects to a first database, such as the database_1 112, and inserts a row in the first database. The client application then connects to a second database, such as the database_T 114, and updates/inserts another row in the second database. The client application then connects to a second messaging engine and sends a response message to a second queue hosted by the second messaging engine, such as a second JMS queue. As such, several distributed resources are accessed by this single transaction across multiple phases of connection requests and resource accesses.

The present technology implements weighted transaction priority based dynamically upon phase of transaction completion by increasing priority of transaction operations, such as connection requests, for applications in later-phases of multi-phase transactions to allow these later-phase transactions to complete ahead of earlier-phase applications/transactions. As such, the present technology may alleviate resource contention and processing overhead.

To continue with a more-detailed description of the processing associated with the present example, to initiate the transaction, the client application executed by the computing device_1 102 sends a request for a first connection to receive a message from the messaging service resource provider_1 234, as represented by the arrow 302. Along with the connection request, the client application also sends information about a currently-requested resource and a second resource it is planning to access after the first back-end resource access of the multi-phase transaction is completed. The request gets enlisted into a multi-phase transaction manager 222, and the multi-phase transaction manager 222 generates connection request information that may be used to request resources, reserve resources, and track transactions as they progress and complete.

The multi-phase transaction manager 222 generates a new transaction identifier (e.g., XID) to identify the distributed multi-phase transaction across the multiple phases of the transaction. The multi-phase transaction manager 222 identifies the client application and establishes a resource reference identifier (RRID) that references the next resource intended to be accessed by the client application in the next phase of the transaction after the current phase of the transaction is completed. The multi-phase transaction manager 222 creates a transaction log (TLOG) with the generated connection request information as described in association with FIG. 4 below.

Figure 4:
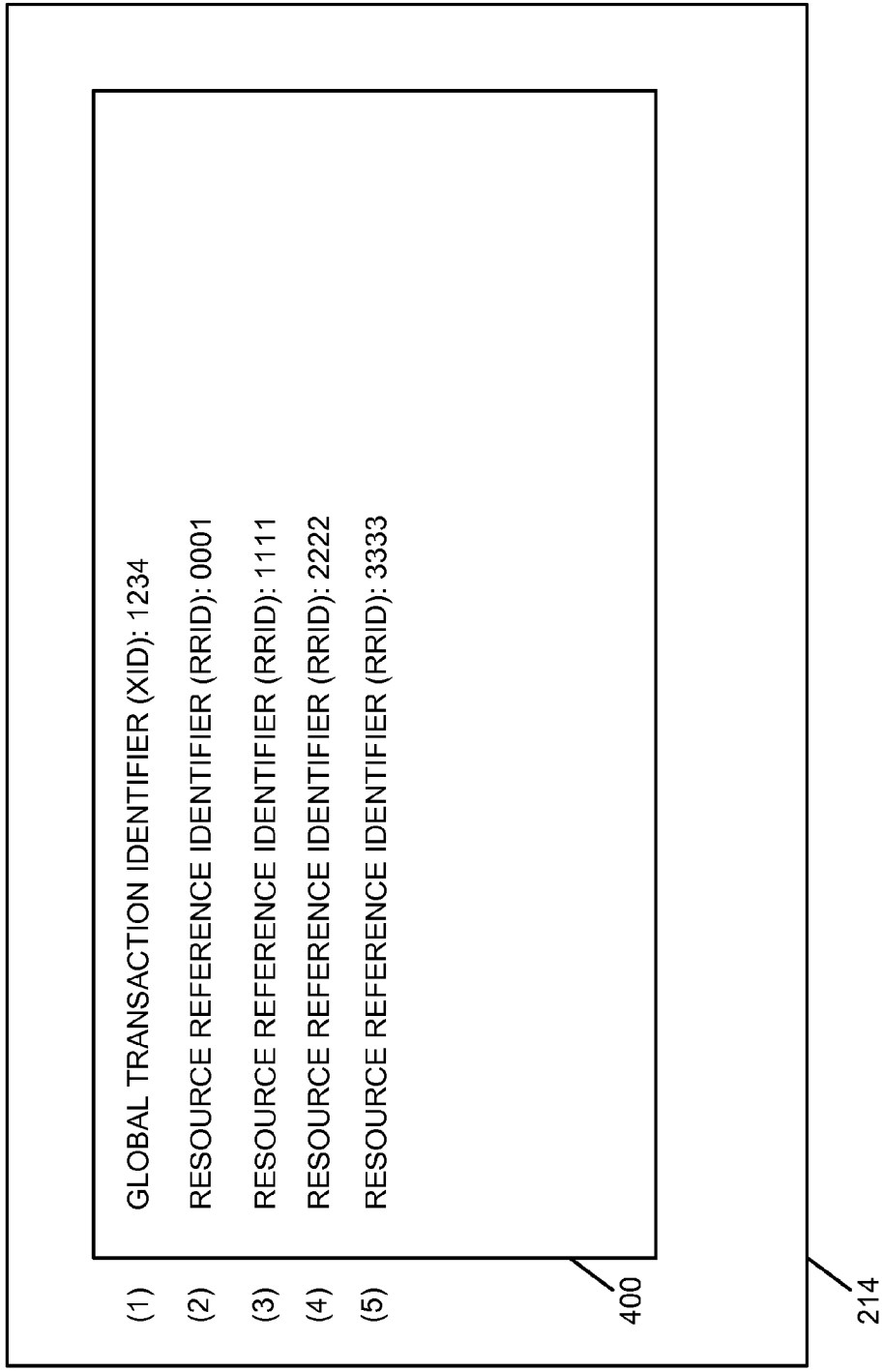
FIG. 4 is a memory diagram of an example of an implementation of a according to an embodiment of the present subject matter.

FIG. 4 is a memory diagram of an example of an implementation of a transaction log 400 that includes the connection request information created by the multi-phase transaction manager 222. As can be seen from FIG. 4, the transaction log 400 is illustrated to be created within the transaction processing storage area 214 in the memory 210 for purposes of illustration, though another memory location such as a memory location internal to the transaction phase-prioritized processing module 216 may be utilized as appropriate for a given implementation. To reduce drawing count, FIG. 4 will be utilized throughout the transaction progression. For purposes of the present phase of processing, it is assumed that the first three (3) lines of the transaction log 400 are populated by the multi-phase transaction manager 222 in response to the first client application request. As can be seen from FIG. 4, a first line (1) of the transaction log 400 includes an XID of "1234," a second line (2) of the transaction log 400 includes an RRID of "0001" that represents a currently-requested resource, and a third line (3) of the transaction log 400 includes an RRID of "1111" that represents a future resource to be requested by the application in the next phase of the distributed multi-phase transaction.

Returning to the description of FIG. 3, in response to creation of the connection request information, the multi-phase transaction manager 222 then sends the connection request information, including the XID value and the two RRID values (current and future resource identifiers, respectively) to the MPGRC 224, as represented by the arrow 304. In response to receiving the connection request information from the multi-phase transaction manager 222, the MPGRC 224 identifies/determines that this is the first request for this particular transaction/XID because it does not currently have the received XID of the associated RRID stored. The MPGRC 224 stores this connection request information within a multi-phase transaction data structure, as described in association with FIG. 5 below.

FIG. 5 is a memory diagram of an example of an implementation of the multi-phase transaction data structure 500 that includes the connection request information received from the multi-phase transaction manager 222. As can be seen from FIG. 5, the multi-phase transaction data structure 500 is illustrated to be created within the transaction processing storage area 214 in the memory 210 for purposes of illustration, though another memory location such as a memory location internal to the transaction phase-prioritized processing module 216 may be utilized as appropriate for a given implementation. To reduce drawing count, FIG. 5 will be utilized throughout the transaction progression. The multi-phase transaction data structure 500 includes several columns of data that are utilized to process transactions for multiple client applications. An XID column 502 stores transaction identifiers for client application transactions, which is set to "1234" for the present transaction within the first line (1) as described above. An RRID column 504 stores resource reference identifiers for resources that are requested to be reserved by client application transactions, which is set to "1111" for the present transaction within the first line (1) as described above. A transaction weight column 506 stores a transaction weight, which is initially set to zero (0) within the first line (1) for the present example. As described above, the transaction weight may be increased as transactions progress to prioritize later-phase transactions over newer transactions to improve transaction completion efficiency and reduce resource content. A resource reference column 508 stores resource references identified by the received RRIDs (e.g., the database_1 112 for purposes of the present example). A reserved resource wait period column 510 identifies a wait period for transaction resource (e.g., connections within the present example, though the resources may be any reserved resource) and may be used to measure transaction completion efficiency and related measurements as described in more detail below, and is initially set to a default value of ten (10) seconds for purposes of example. It should be noted that the values of certain fields within the multi-phase transaction data structure 500 change as the present example progresses. The MPGRC 224 may utilize the timer/clock module 218 to derive and measure timing as transactions progress, as described in more detail below. The MPGRC 224 may start a timer within the timer/clock module 218 to begin time measurement for the current reservation request, and other resource reservation requests, as described below. To reduce drawing count, double brackets (e.g., "[[" and "]]") and underlining are utilized to reflect edits to field values within the multi-phase transaction data structure 500. As such, the double brackets surrounding the "10 SECONDS" value in the column 510 represents that this value is changed as the present example progresses, as described in more detail below.

Returning to the description of FIG. 3, the MPGRC 224 keeps track of transaction identifiers, the next resource the client application intends to access, transaction weights, resources that have reserved connections, and reserved connection wait periods for multiple transactions using the multi-phase transaction data structure 500.

Continuing with the present example, the MPGRC 224 forwards the request including the XID and RRID to the appropriate connection manager, which is the connection manager_1 226 within the present example, as represented by the arrow 306 within FIG. 3. It is assumed for purposes of example that the connection to the connection manager_1 226 is successful.

The connection manager_1 226 then notifies the second connection manager (e.g., the connection manager_2 228 within the present example), as represented by the arrow 308, to reserve a connection for this global distributed multi-phase transaction using the XID, RRID, and maximum reservation wait time (ten (10) seconds for purposes of the present example). The connection manager_2 228 reserves the requested connection in advance for the XID-RRID (1234-1111) as specified by the client application in the original request. The connection manager_2 228 is now responsible for creating a connection to the back-end system and then associating the newly-created connection with the specified XID and RRID so that the connection is available when the client application enters the phase of processing where it is ready to access to the respective back-end resource. The connection manager_2 228 sets the maximum reservation wait time for this newly-created connection to the reserved connection wait time period as notified by the MPGRC 224 (ten (10) seconds for purposes of the present example). As such, if the client application does not access the respective resource within the specified maximum reservation wait time, the connection may be released and returned to the respective connection pool for use by other client applications.

Once the client application has completed the request for receiving the message (phase 1, using the first resource), the client application initiates a request to connect to the database_1 112, as described above using the connection manager_2 228 and the database connection resource provider_1 236. Along with this new request, the client application also sends the next resource to be used/accessed (e.g., the database_N 114 for purposes of example). For purposes of example, an RRID of "2222" is associated with the database_N 114.

The multi-phase transaction manager 222 enlists this new transaction using the RRID "2222" as shown within FIG. 4 in line 4 of the transaction log 400. The multi-phase transaction manager 222 forwards the request to the MPGRC 224. The new request by the multi-phase transaction manager 222 using the same XID "1234" is an indication to the MPGRC 224 that the previous branched transaction (e.g., phase) has completed. The indication that the previous branched transaction has completed allows MPGRC 224 to calculate the time taken for the first phase of the transaction. For purposes of example, that time is assumed to be five hundred milliseconds (500 ms).

The MPGRC 224 identifies from the multi-phase transaction data structure 500 that this request is part of the ongoing transaction. As can be seen from FIG. 5, the MPGRC 224 has updated the line (1) column 510 of the multi-phase transaction data structure 500 to reflect the completion time of five hundred milliseconds (500 ms) for the first phase of the transaction. The double brackets (e.g., "[[" and "]]") represent a deletion of the previous value of "10 SECONDS" from line (1) of the multi-phase transaction data structure 500, and the underlined "500 MS" represents new data for this field of the multi-phase transaction data structure 500.

The MPGRC 224 inserts a new entry into a new line (2) of the multi-phase transaction data structure 500. The XID column 502 again stores a transaction identifier (XID) of "1234". The RRID column 504 stores the resource reference identifier "2222" received from the client application. The MPGRC 224 has increased the transaction weight within the column 506 to ten (10) for purposes of the present example, though any form of increase may be used as appropriate for a given implementation. The resource reference column 508 stores the resource reference of the resource identified by the resource reference identifier (RRID) received from the client application that identifies the next resource to be used in the next transaction phase (e.g., the database_N 114 for purposes of the present example). The reserved resource wait period column 510 is again set to a default value of ten (10) seconds for purposes of example. As described above, it should be noted that the values of certain fields within the multi-phase transaction data structure 500 change as the present example progresses. Again, to reduce drawing count, double brackets (e.g., "[[" and "]]") and underlining are utilized to reflect edits to field values within the multi-phase transaction data structure 500. As such, the double brackets surrounding the "10 SECONDS" value in the column 510, line (2), represents that this value is changed as the present example progresses, as described in more detail below.

Returning to the description of FIG. 3, the MPGRC 224 sends the request for connection to the connection manager_2 228. As described above, the first phase of the transaction processing took only five hundred milliseconds (500 ms) to complete, which was within the reserved connection wait period of ten (10) seconds. As such, the connection is still reserved as requested by the client application.

The connection manager_2 228 validates that the request is for 1234-1111 (the XID and RRID previously requested to be reserved). If the request is validated to reference the reserved connection (assumed true for purposes of the present example), then the connection manager_2 228 will return the reserved connection to the requesting client application.

Once the connection manager_2 228 successfully provides the connection to the client application, the MPGRC 224 notifies the connection manager_3 230 to reserve a connection for a request designated by XID and RRID 1234-2222, and again provides the ten (10) second reserved connection wait period to the connection manager_3 230.

The same process of allocating the connection and reserving the connection now happens for the next resource, and the processing continues until the distributed multi-phase transaction completes. The MPGRC 224 continues to increase the transaction weighting as the transaction progresses across the multiple phases.

FIG. 4 and FIG. 5 are shown to be updated with new values based upon this request. A new line (5) of the transaction log 400 stores the next RRID of "3333" for the next resource requested. Similarly, as can be seen from FIG. 5, it is assumed that the second phase of the transaction took an additional two hundred and fifty milliseconds (250 ms) for a total of seven hundred and fifty milliseconds (750 ms), and that the reserved resource wait period column 510 in the line (2) has been updated to reflect the total transaction time up to this point in the processing. As such, the MPGRC 224 may continually evaluate transaction times as transactions progress.

A new line (3) of the multi-phase transaction data structure 500 stores resource reservation information for the new resource reservation request. The XID column 502 again stores a transaction identifier (XID) of "1234". The RRID column 504 stores the resource reference identifier "3333" received from the client application. The MPGRC 224 has increased the transaction weight within the column 506 to twenty (20) for purposes of the present example, though any form of increase may be used as appropriate for a given implementation. The resource reference column 508 stores the resource reference of the resource identified by the resource reference identifier (RRID) received from the client application that identifies the next resource to be used in the next transaction phase (e.g., the messaging service resource provider_2 238 for purposes of the present example). The reserved resource wait period column 510 is again set to a default value of ten (10) seconds for purposes of example. The example has progressed sufficiently to detail the processing performed by the respective components, and as such, no double brackets are illustrated around the "10 SECONDS" value. The ellipsis dots within FIG. 5 illustrate that the processing may continue.

Additionally, it should be noted that the transaction log 400 and the multi-phase transaction data structure 500 may include entries for multiple global transactions associated with multiple client applications. Alternatively, separate logs and data structures may be maintained as appropriate for a given implementation. As such, the MPGRC 224 may manage transactions for multiple client applications within a complex distributed multi-phase transaction environment and may efficiently allocate priority to transactions with higher transaction weighting. Accordingly, and for purposes of example, if a new transaction is initiated from another client application, that new transaction may be assigned a transaction weighting of zero (0), and the transaction described above that has advanced to a transaction weighting of twenty (20) may be granted priority for connection requests.

In view of the description above, every time an application requests a connection, it also sends the information about the next resource that will be accessed. The transaction manager generates an XID and RRID that are unique for each of the transaction and the sub-transaction within the global transaction. The transaction manager passes the information about the resource reference, transaction, and resource reference identifier and the application reference to the multi-phase global resource coordinator (MPGRC) 224. The MPGRC 224 maintains the list of applications accessing the transactions, along with all the resource reference details and the time taken for each of the transactions to be completed. The MPGRC 224 continues to update the time taken for the completion of transactions across different phases. It will only update if the time taken is more than the previously stored transaction time. The MPGRC 224 maintains a log of the largest time taken by the transaction to complete and uses this information to set the expiration value for the reserved connection. The connection manager is responsible for reserving a new connection for the application based on the transaction's XID and RRID. The connection manager stores this new connection in its pool and locks the connection so that no other application may request the connection (prior to its use or expiration of the configured wait time). The connection manager also sets the lock expiration to be equivalent to the value set by the MPGRC 224. When the application tries to access the next resource that it has reserved, the locked connection is automatically provided to the application based on priority (after verifying if it was the same application for which the connection was reserved). Accordingly, the MPGRC 224 may prioritize each connection request in real time as they are received against the reserved resources of more advanced-stage transactions and may intelligently allocate priority to more-advanced transactions, thereby alleviating resource contention and improving transaction completion times.

Figure 6:
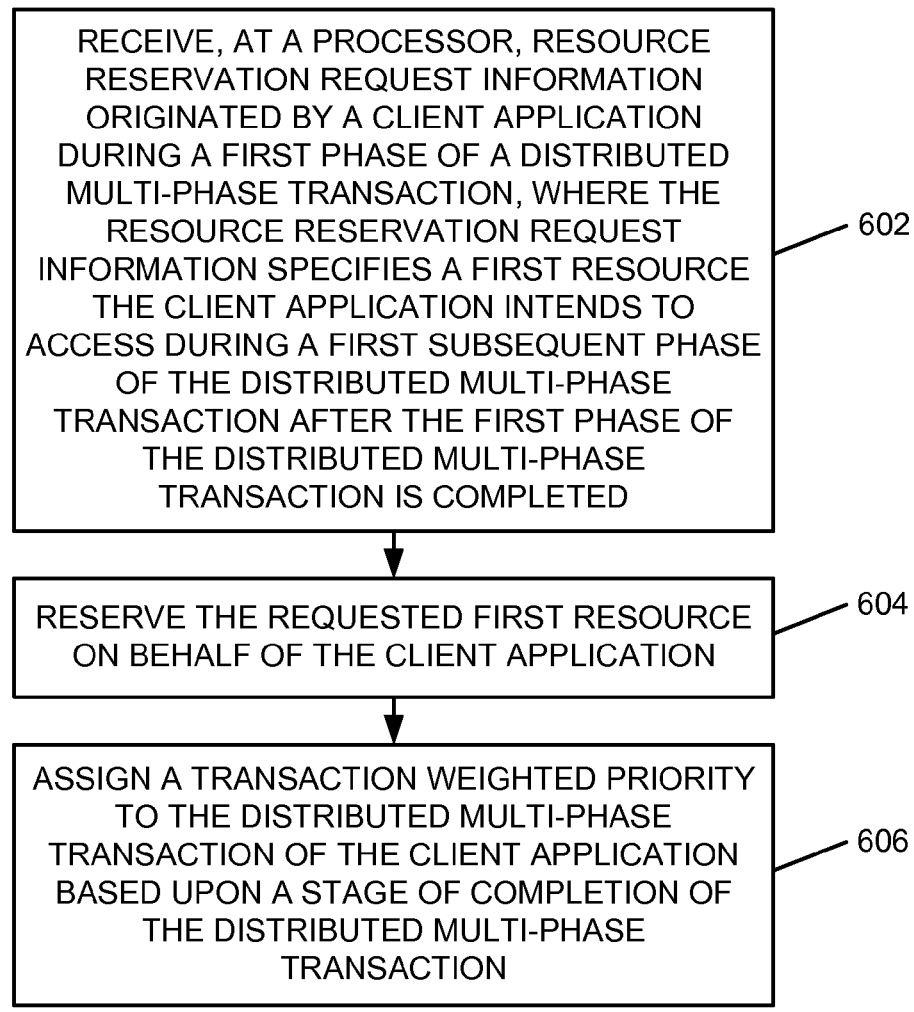
FIG. 6 is a flow chart of an example of an implementation of a process for weighted transaction priority based dynamically upon phase of transaction completion according to an embodiment of the present subject matter.
Figure 7A:
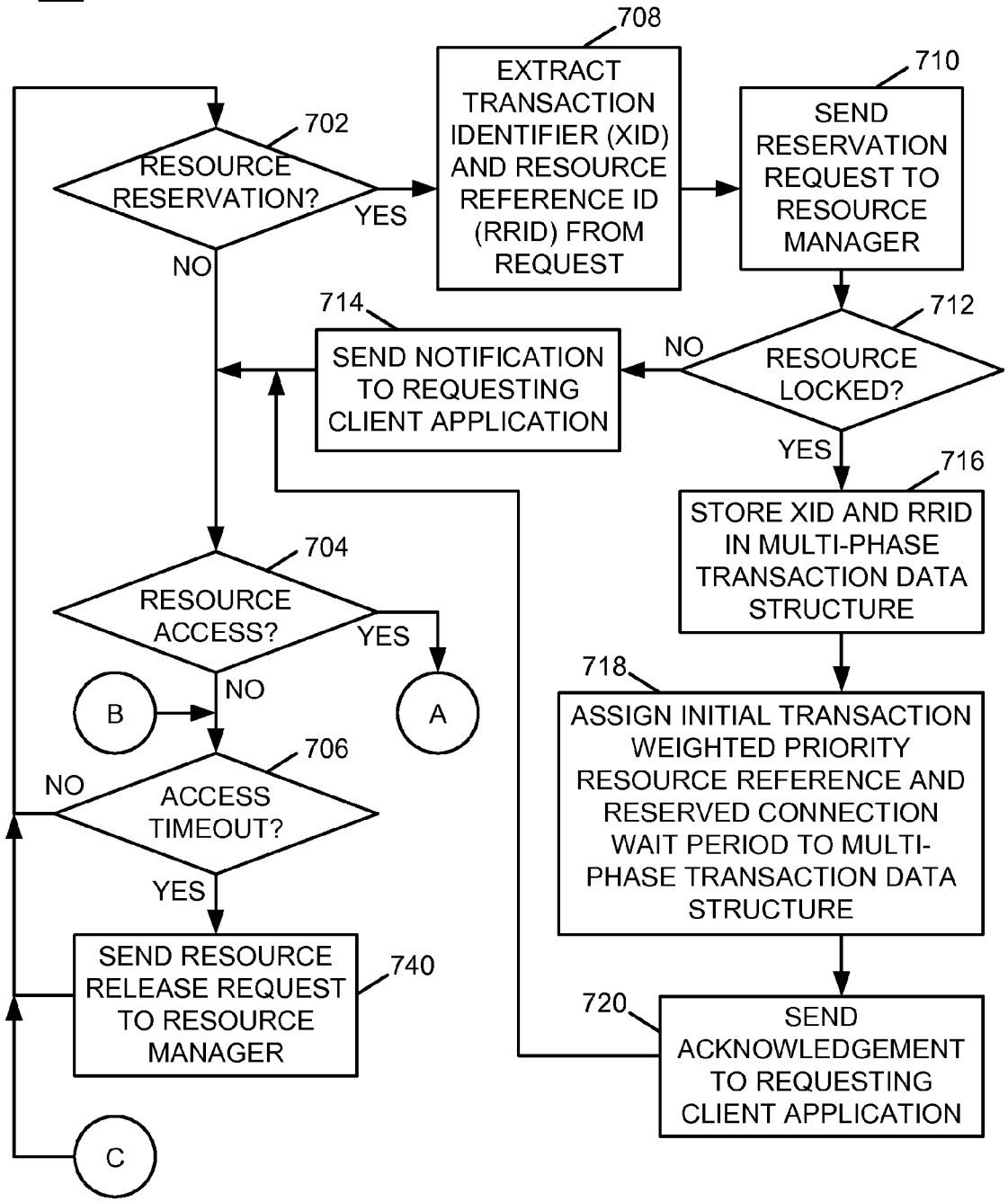
FIG. 7A is a flow chart of an example of an implementation of initial processing within a process for weighted transaction priority based dynamically upon phase of transaction completion according to an embodiment of the present subject matter.
Figure 7B:
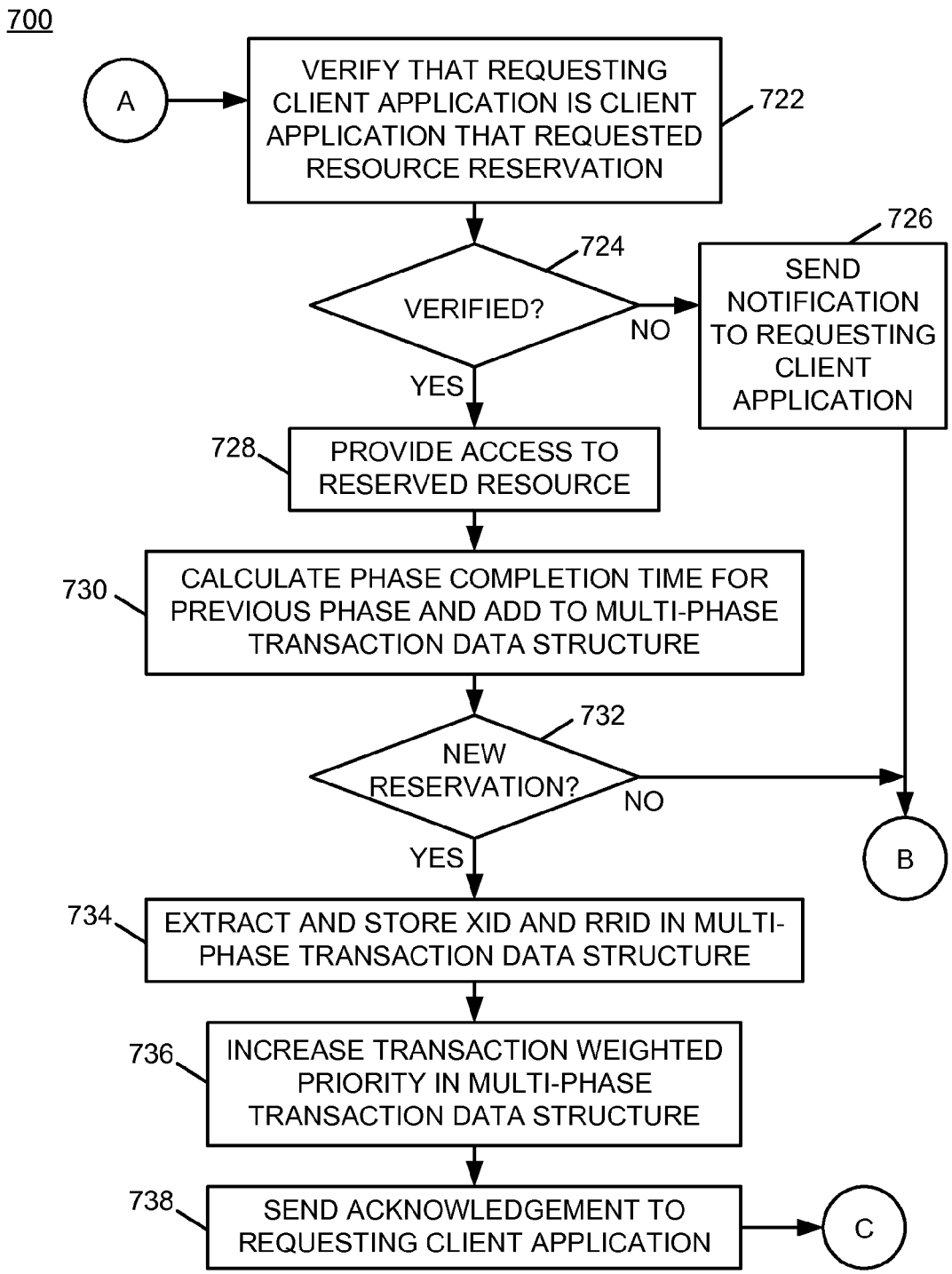
FIG. 7B is a flow chart of an example of an implementation of additional processing within a process for weighted transaction priority based dynamically upon phase of transaction completion according to an embodiment of the present subject matter.

FIG. 6 through FIG. 7B described below represent example processes that may be executed by devices, such as the core processing module 200, to perform the weighted transaction priority based dynamically upon phase of transaction completion associated with the present subject matter. Many other variations on the example processes are possible and all are considered within the scope of the present subject matter. The example processes may be performed by modules, such as the transaction phase-prioritized processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for weighted transaction priority based dynamically upon phase of transaction completion. At block 602, the process 600 receives, at a processor, resource reservation request information originated by a client application during a first phase of a distributed multi-phase transaction, where the resource reservation request information specifies a first resource the client application intends to access during a first subsequent phase of the distributed multi-phase transaction after the first phase of the distributed multi-phase transaction is completed. At block 604, the process 600 reserves the requested first resource on behalf of the client application. At block 606, the process 600 assigns a transaction weighted priority to the distributed multi-phase transaction of the client application based upon a stage of completion of the distributed multi-phase transaction.

FIGS. 7A-7B illustrate a flow chart of an example of an implementation of a process 700 for weighted transaction priority based dynamically upon phase of transaction completion. FIG. 7A illustrates initial processing within the process 700. At decision point 702, the process 700 begins a higher-level processing iteration by making a determination as to whether a resource reservation request has been detected/received. The resource reservation request may be received, for example, from an application or from a transaction manager in the form of resource reservation request information originated by a client application during a given (e.g., current or first) phase of a distributed multi-phase transaction. The resource reservation request information may specify a given resource the client application intends to access during a subsequent phase of the distributed multi-phase transaction after the given phase of the distributed multi-phase transaction is completed. Affirmative processing in association with a determination at decision point 702 will be deferred and described in more detail below to complete a description of the higher-level processing within the process 700.

As such, in response to determining at decision point 702 that a resource reservation request has not been detected/received, the process 700 makes a determination at decision point 704 as to whether a resource access request has been received/detected. A resource access request, as described in more detail below, may include a request to access a resource during the subsequent phase of the transaction that was reserved by a client application during the prior phase of a distributed multi-phase transaction. Again, affirmative processing in association with a determination at decision point 704 will be deferred and described in more detail below to complete a description of the higher-level processing within the process 700.

As such, in response to determining at decision point 704 that a resource access request has not been received/detected, the process 700 makes a determination at decision point 706 as to whether a resource access reservation timeout has occurred because a client application has not accessed a resource within the configured reserved resource wait period, also as described in more detail below. As with the other higher-level processing of the process 700, affirmative processing in association with a determination at decision point 706 will be deferred and described in more detail below to complete a description of the higher-level processing within the process 700. As such, in response to determining at decision point 706 that a resource access reservation timeout has not occurred, the process 700 returns to decision point 702 and iterates as described above.

Returning to the description of decision point 702, in response to determining that a resource reservation request has been detected/received, the process 700 extracts a transaction identifier (XID) and a resource reference identifier (RRID) from the request at block 708. It should be noted that the resource reservation request may also include the application identifier of the application that requests reservation of the resource, though the transaction identifier may also incorporate and uniquely represent the transaction, as appropriate for a given implementation. At block 710, the process 700 sends a reservation request including the RRID to the respective resource manager that manages the requested resource. As such, the process 700 notifies the resource manager that manages the requested resource that the client application intends to access the requested resource during the next subsequent phase of the distributed multi-phase manager transaction.

At decision point 712, the process 700 makes a determination as to whether it has received an acknowledgement from the resource manager that the requested resource is reserved for access by the client application and that the resource manager has locked the requested resource to reserve the resource (e.g, a connection, etc.). In response to determining at decision point 712 that the response from the resource manager indicates that the requested resource is not reserved, such as where resources are consumed by higher-priority later-stage transactions, the process 700 sends a notification to the requesting client application at block 714. The process 700 returns to decision point 704 and iterates as described above.

Alternatively, in response to determining at decision point 712 that the response from the resource manager indicates that the requested resource is reserved for the requesting client application, at block 716 the process 700 stores the XID and RRID within a multi-phase transaction data structure, such as the multi-phase transaction data structure 500 described above in association with FIG. 5. At block 718, the process 700 assigns an initial transaction weighted priority and assigns a reserved resource wait period for the connection to the distributed multi-phase transaction of the client application based upon the stage of completion of the distributed multi-phase transaction. As such, the process 700 reserves the requested resource on behalf of the client application. The assigned transaction weighted priority may be based upon a stage of completion of the distributed multi-phase transaction, as described above. The reserved resource wait period may specify a duration of time to maintain the reserved resource during the given phase of the distributed multi-phase transaction so that the resource reservation may be released if the requesting client application does not access the reserved resource within the specified reserved resource wait period. This assignment of the initial transaction weighted priority and the reserved resource wait period may include adding the assigned transaction weighted priority and the reserved resource wait period to the multi-phase transaction data structure, as also described above in association with FIG. 5.

In this way, the process 700 may provide resource access priority to the reserved resource to the distributed multi-phase transaction of the client application relative to other earlier-phase distributed multi-phase transactions associated with other client applications that are in a lesser stage of completion than the stage of completion of the distributed multi-phase transaction of the client application. The provided resource access priority may be provided based upon the assigned transaction weighted priority during the given subsequent phase of the distributed multi-phase transaction. Further, the resource reservation may be preserved for the length of time represented by the reserved resource wait period.

At block 720, the process 700 sends an acknowledgement to the requesting client application that the requested resource has been reserved. The process 700 returns to decision point 704 and iterates as described above.

Returning to the description of decision point 704, the process 700 may receive an access request that specifies the reserved resource from the client application during the subsequent phase of the distributed multi-phase transaction that was reserved during the previous (or initial) phase. As such, in response to determining that a resource access request has been received/detected that specifies a reserved resource to access, the process 700 transitions to the processing shown and described in association with FIG. 7B.

FIG. 7B illustrates additional processing associated with the process 700 for weighted transaction priority based dynamically upon phase of transaction completion. At block 722, the process 700 verifies that a requesting client application that originated the request to access the reserved resource is the client application that requested the reservation of the resource. At decision point 724, the process 700 makes a determination as to whether the requesting client application that originated the request to access the reserved resource is the client application that requested the reservation of the resource.

In response to determining at decision point 724 that the requesting client application that originated the request to access the reserved resource is not the client application that requested the reservation of the resource, the process 700 sends a notification to the requesting client application at block 726 and returns to the processing described in association with FIG. 7A at decision point 706 and iterates as described above. In this manner, the process 700 preserves the priority of the transaction that reserved the resource against other requesting client applications.

Alternatively, in response to determining at decision point 724 that the requesting client application that originated the request to access the reserved resource is the client application that requested the reservation of the resource, at block 728 the process 700 provides access to the reserved resource by the client application during the subsequent phase of the distributed multi-phase manager transaction. At block 730, the process 700 calculates a transaction phase completion time for the previous phase of processing for the transaction by the client application and adds the actual completion time to the multi-phase transaction data structure. As such, the process 700 may calculate, based upon a time of receipt of the access request relative to a reserved resource wait period, a duration of the previous phase of the distributed multi-phase transaction based upon the reserved resource wait period. As described above, as one possible alternative, the process 700 may update the reserved connection wait period field of the reserved resource row with the transaction phase completion time to document time of completion of the previous phase of the transaction by the respective client application. In this manner, the process 700 may track progress and completion times for various phases of transactions and utilization of resources.

At decision point 732, the process 700 makes a determination as to whether new reservation request information has been received with the resource access request. As such, the process 700 may receive, as part of an access request from the client application to access the reserved resource during the subsequent phase of the distributed multi-phase transaction, new reservation request information originated by the client application during the subsequent phase of the distributed multi-phase transaction. The new reservation request information may specify a second resource the client application intends to access during a second subsequent phase of the distributed multi-phase transaction after the current (subsequent to the initial) phase of the distributed multi-phase transaction is completed. This sequential phase processing for resource reservation and resource access may continue until the transaction is completed.

In response to determining at decision point 732 that new reservation request information has not been received with the resource access request (e.g., that the last phase of the multi-phase transaction is the current phase), the process 700 returns to the processing described in association with FIG. 7A at decision point 706 and iterates as described above. In response to determining at decision point 732 that new reservation request information has been received with the resource access request (e.g., that the current phase is not the last phase of the multi-phase transaction for this particular client application), at block 734 the process 700 extracts the XID (same as for previous phases) and the new RRID from the access request, and stores the XID and the new RRID within the multi-phase transaction data structure, such as the multi-phase transaction data structure 500 described above in association with FIG. 5.

At block 736, the process 700 increases the transaction weighted priority assigned to the distributed multi-phase transaction of the client application based upon an updated stage of completion of the distributed multi-phase transaction. As described above, a new row of the multi-phase data structure may be created and the transaction weighted priority assigned to the distributed multi-phase transaction may be increased within the multi-phase data structure. At block 738, the process 700 sends an acknowledgement to the requesting client application that the reserved resource may be accessed. The process 700 returns to the processing described in association with FIG. 7A at decision point 702 and iterates as described above.

Returning to the description of decision point 706, in response to determining that a resource access reservation timeout has occurred because a client application has not accessed a resource within the configured reserved resource wait period, the process 700 sends a resource release request message to the respective resource manager that has the resource reserved at block 740. As such, the process 700 releases reservation of the reserved resource if the reserved resource is not accessed by the client application during the subsequent phase of the distributed multi-phase transaction within the reserved resource wait period and other client applications may now request reservation of the released resource. The process 700 returns to decision point 702 at iterates as described above.

As such, the process 700 operates to reserve resources that are intended to be used by client applications during subsequent phases of distributed multi-phase transactions. The process 700 assigns a transaction weighted priority to the distributed multi-phase transaction of the client application based upon a stage of completion of the distributed multi-phase transaction. The process 700 processes access requests to reserved resources and increases the transactional priority as the transaction progresses through the multiple stages to ensure that later-stage transactions have higher priority for resource reservation, and completion of the transactions. The process 700 continues to reserve resources intended to be used during subsequent transactional phases. The process 700 releases resource reservations if the resources are not utilized during the configured reserved resource connection wait period. As such, the process 700 may reduce resource contention while concurrently reducing the complexity of backing out later-stage transactions and allowing more advanced stage transactions to complete without resource contention. As such, distributed multi-phase transactional processing may be improved by implementation of the present technology.

As described above in association with FIG. 1 through FIG. 7B, the example systems and processes provide weighted transaction priority based dynamically upon phase of transaction completion. Many other variations and additional activities associated with weighted transaction priority based dynamically upon phase of transaction completion are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:

receiving, at a processor of an on-line transaction processing (OLTP) system, resource reservation request information created in real time by a client application during application processing of a first phase of a distributed multi-host multi-phase transaction that involves multiple different hosts that each sequentially manage different transactional information within the OLTP system in different phases of the distributed multi-host multi-phase transaction, where all phases managed by the multiple different hosts must sequentially succeed as a set and if a failure occurs in any phase all previous completed phases must be rolled back by the respective hosts that managed the respective previous completed phases, and where the resource reservation request information specifies a first resource the client application intends to access during a first subsequent phase of the distributed multi-host multi-phase transaction after the first phase of the distributed multi-host multi-phase transaction is completed;
reserving the requested first resource within the OLTP system on behalf of the client application; and
assigning a transaction weighted priority to the distributed multi-host multi-phase transaction of the client application based upon a stage of completion of the distributed multi-host multi-phase transaction.

2. The method of claim 1, further comprising:
receiving a request to access the reserved first resource during the first subsequent phase of the distributed multi-host multi-phase transaction;
verifying that a requesting client application that originated the request to access the reserved first resource is the client application that requested the reservation of the first resource; and
providing, in response to verifying that the requesting client application is the client application that requested the reservation of the resource, access to the reserved first resource by the client application during the first subsequent phase of the distributed multi-host multi-phase transaction.

3. The method of claim 1, further comprising:
receiving, as part of an access request from the client application to access the reserved first resource during the first subsequent phase of the distributed multi-host multi-phase transaction, new reservation request information created in real time by the client application during application processing of the first subsequent phase of the distributed multi-host multi-phase transaction that specifies a second resource the client application intends to access during a second subsequent phase of the distributed multi-host multi-phase transaction after the first subsequent phase of the distributed multi-host multi-phase transaction is completed; and
increasing the transaction weighted priority assigned to the distributed multi-host multi-phase transaction of the client application based upon an updated stage of completion of the distributed multi-host multi-phase transaction.

4. The method of claim 1, where reserving the requested first resource within the OLTP system on behalf of the client application comprises:
notifying a resource manager that manages the requested first resource that the client application intends to access the requested first resource during the first subsequent phase of the distributed multi-host multi-phase manager transaction; and
receiving an acknowledgement from the resource manager that the requested first resource is reserved for access by the client application.

5. The method of claim 1, where:
assigning the transaction weighted priority to the distributed multi-host multi-phase transaction of the client application based upon the stage of completion of the distributed multi-host multi-phase transaction comprises:
adding the assigned transaction weighted priority to a multi-phase transaction data structure; and
further comprising:
adding a reserved resource wait period to the multi-phase transaction data structure, where the reserved resource wait period specifies a duration of time to hold the reserved first resource during the first phase of the distributed multi-host multi-phase transaction; and
releasing reservation of the reserved first resource if the reserved first resource is not accessed by the client application during the first subsequent phase of the distributed multi-host multi-phase transaction within the reserved resource wait period.

6. The method of claim 1, further comprising:
receiving an access request that specifies the reserved first resource from the client application during the first subsequent phase of the distributed multi-host multi-phase transaction; and
calculating, based upon a time of receipt of the access request relative to a reserved resource wait period, a duration of the first phase of the distributed multi-host multi-phase transaction based upon the reserved resource wait period.

7. The method of claim 1, further comprising providing, based upon the assigned transaction weighted priority during the first subsequent phase of the distributed multi-host multi-phase transaction, resource access priority to the reserved first resource by the distributed multi-host multi-phase transaction of the client application relative to other earlier-phase distributed multi-host multi-phase transactions associated with other client applications that comprise a lesser stage of completion than the stage of completion of the distributed multi-host multi-phase transaction of the client application.

8. A system, comprising:
a memory; and
a processor of an on-line transaction processing (OLTP) system programmed to:
receive resource reservation request information created in real time by a client application during application processing of a first phase of a distributed multi-host multi-phase transaction that involves multiple different hosts that each sequentially manage different transactional information within the OLTP system in different phases of the distributed multi-host multi-phase transaction, where all phases managed by the multiple different hosts must sequentially succeed as a set and if a failure occurs in any phase all previous completed phases must be rolled back by the respective hosts that managed the respective previous completed phases, and where the resource reservation request information specifies a first resource the client application intends to access during a first subsequent phase of the distributed multi-host multi-phase transaction after the first phase of the distributed multi-host multi-phase transaction is completed;
reserve the requested first resource within the OLTP system on behalf of the client application; and
assign within the memory a transaction weighted priority to the distributed multi-host multi-phase transaction of the client application based upon a stage of completion of the distributed multi-host multi-phase transaction.

9. The system of claim 8, where the processor is further programmed to:
receive a request to access the reserved first resource during the first subsequent phase of the distributed multi-host multi-phase transaction;

verify that a requesting client application that originated the request to access the reserved first resource is the client application that requested the reservation of the first resource; and provide, in response to verifying that the requesting client application is the client application that requested the reservation of the resource, access to the reserved first resource by the client application during the first subsequent phase of the distributed multi-host multi-phase transaction.

10. The system of claim 8, where the processor is further programmed to:

receive, as part of an access request from the client application to access the reserved first resource during the first subsequent phase of the distributed multi-host multi-phase transaction, new reservation request information created in real time by the client application during application processing of the first subsequent phase of the distributed multi-host multi-phase transaction that specifies a second resource the client application intends to access during a second subsequent phase of the distributed multi-host multi-phase transaction after the first subsequent phase of the distributed multi-host multi-phase transaction is completed; and increase the transaction weighted priority assigned within the memory to the distributed multi-host multi-phase transaction of the client application based upon an updated stage of completion of the distributed multi-host multi-phase transaction.

11. The system of claim 8, where in being programmed to reserve the requested first resource within the OLTP system on behalf of the client application, the processor is programmed to:

notify a resource manager that manages the requested first resource that the client application intends to access the requested first resource during the first subsequent phase of the distributed multi-host multi-phase manager transaction; and receive an acknowledgement from the resource manager that the requested first resource is reserved for access by the client application.

12. The system of claim 8, where:

in being programmed to assign within the memory the transaction weighted priority to the distributed multi-host multi-phase transaction of the client application based upon the stage of completion of the distributed multi-host multi-phase transaction, the processor is programmed to:

add the assigned transaction weighted priority to a multi-phase transaction data structure; and the processor is further programmed to:

add a reserved resource wait period to the multi-phase transaction data structure, where the reserved resource wait period specifies a duration of time to hold the reserved first resource during the first phase of the distributed multi-host multi-phase transaction; and release reservation of the reserved first resource if the reserved first resource is not accessed by the client application during the first subsequent phase of the distributed multi-host multi-phase transaction within the reserved resource wait period.

13. The system of claim 8, where the processor is further programmed to:

receive an access request that specifies the reserved first resource from the client application during the first subsequent phase of the distributed multi-host multi-phase transaction; and calculate, based upon a time of receipt of the access request relative to a reserved resource wait period, a duration of the first phase of the distributed multi-host multi-phase transaction based upon the reserved resource wait period.

14. A computer program product, comprising:

a non-transitory computer readable storage medium having computer readable program code embodied therewith, where the computer readable program code when executed on a computer of an on-line transaction processing (OLTP) system causes the computer to:

receive resource reservation request information created in real time by a client application during application processing of a first phase of a distributed multi-host multi-phase transaction that involves multiple different hosts that each sequentially manage different transactional information within the OLTP system in different phases of the distributed multi-host multi-phase transaction, where all phases managed by the multiple different hosts must sequentially succeed as a set and if a failure occurs in any phase all previous completed phases must be rolled back by the respective hosts that managed the respective previous completed phases, and where the resource reservation request information specifies a first resource the client application intends to access during a first subsequent phase of the distributed multi-host multi-phase transaction after the first phase of the distributed multi-host multi-phase transaction is completed;

reserve the requested first resource within the OLTP system on behalf of the client application; and assign a transaction weighted priority to the distributed multi-host multi-phase transaction of the client application based upon a stage of completion of the distributed multi-host multi-phase transaction.

15. The computer program product of claim 14, where the computer readable program code when executed on the computer further causes the computer to:

receive a request to access the reserved first resource during the first subsequent phase of the distributed multi-host multi-phase transaction;

verify that a requesting client application that originated the request to access the reserved first resource is the client application that requested the reservation of the first resource; and provide, in response to verifying that the requesting client application is the client application that requested the reservation of the resource, access to the reserved first resource by the client application during the first subsequent phase of the distributed multi-host multi-phase transaction.

16. The computer program product of claim 14, where the computer readable program code when executed on the computer further causes the computer to:

receive, as part of an access request from the client application to access the reserved first resource during the first subsequent phase of the distributed multi-host multi-phase transaction, new reservation request information created in real time by the client application during application processing of the first subsequent phase of the distributed multi-host multi-phase transaction that specifies a second resource the client application intends to access during a second subsequent phase of the distributed multi-host multi-phase transaction after the first subsequent phase of the distributed multi-host multi-phase transaction is completed; and increase the transaction weighted priority assigned to the distributed multi-host multi-phase transaction of the client application based upon an updated stage of completion of the distributed multi-host multi-phase transaction.

17. The computer program product of claim 14, where in causing the computer to reserve the requested first resource within the OLTP system on behalf of the client application, the computer readable program code when executed on the computer causes the computer to:

notify a resource manager that manages the requested first resource that the client application intends to access the requested first resource during the first subsequent phase of the distributed multi-host multi-phase manager transaction; and receive an acknowledgement from the resource manager that the requested first resource is reserved for access by the client application.

18. The computer program product of claim 14, where:

in causing the computer to assign the transaction weighted priority to the distributed multi-host multi-phase transaction of the client application based upon the stage of completion of the distributed multi-host multi-phase transaction, the computer readable program code when executed on the computer causes the computer to:

add the assigned transaction weighted priority to a multi-phase transaction data structure; and the computer readable program code when executed on the computer further causes the computer to:

add a reserved resource wait period to the multi-phase transaction data structure, where the reserved resource wait period specifies a duration of time to hold the reserved first resource during the first phase of the distributed multi-host multi-phase transaction; and release reservation of the reserved first resource if the reserved first resource is not accessed by the client application during the first subsequent phase of the distributed multi-host multi-phase transaction within the reserved resource wait period.

19. The computer program product of claim 14, where the computer readable program code when executed on the computer further causes the computer to:

receive an access request that specifies the reserved first resource from the client application during the first subsequent phase of the distributed multi-host multi-phase transaction; and calculate, based upon a time of receipt of the access request relative to a reserved resource wait period, a duration of the first phase of the distributed multi-host multi-phase transaction based upon the reserved resource wait period.

20. The computer program product of claim 14, where the computer readable program code when executed on the computer further causes the computer to provide, based upon the assigned transaction weighted priority during the first subsequent phase of the distributed multi-host multi-phase transaction, resource access priority to the reserved first resource by the distributed multi-host multi-phase transaction of the client application relative to other earlier-phase distributed multi-host multi-phase transactions associated with other client applications that comprise a lesser stage of completion than the stage of completion of the distributed multi-host multi-phase transaction of the client application.

\* \* \* \* \*